United States Patent
Malik et al.

(10) Patent No.: US 6,445,165 B1
(45) Date of Patent: Sep. 3, 2002

(54) CIRCUIT FOR LIMITING INRUSH CURRENT TO A POWER SOURCE

(75) Inventors: Randhir Singh Malik, Cary; William Hemena, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/960,553

(22) Filed: Sep. 21, 2001

(51) Int. Cl.[7] .................................................. G05F 1/10
(52) U.S. Cl. .......................... 323/222; 323/908; 363/53
(58) Field of Search ................................ 323/908, 901, 323/222, 284; 363/86, 89, 53, 50; 361/18, 101, 111, 58

(56) References Cited

U.S. PATENT DOCUMENTS

| | | | |
|---|---|---|---|
| 5,010,293 A | * | 4/1991 | Ellersick ..................... 323/278 |
| 5,187,653 A | | 2/1993 | Lorenz |
| 5,420,780 A | | 5/1995 | Bernstein et al. |
| 5,574,632 A | * | 11/1996 | Pansier ........................ 323/901 |
| 5,789,723 A | | 8/1998 | Hirst |
| 5,930,130 A | | 7/1999 | Katyl et al. |
| 6,111,365 A | | 8/2000 | Mirskiy et al. |
| 6,163,469 A | * | 12/2000 | Yuki ........................... 323/908 |

* cited by examiner

*Primary Examiner*—Shawn Riley
(74) *Attorney, Agent, or Firm*—Sawyer Law Group LLP

(57) ABSTRACT

A circuit for limiting inrush current to a power source is disclosed. The circuit includes a low voltage drop semiconductor device coupled to the power source and a resistor coupled in parallel with the low voltage drop semiconductor device. The circuit further includes a diode coupled in parallel with the resistor and an AC detector coupled to the low drop semiconductor device. The AC detector controls the low voltage drop semiconductor device in a manner such that when power is applied to the power source the inrush current to the power source is minimized. The low voltage drop semiconductor device is utilized in conjunction with an AC detector to simultaneously reduce transistor power dissipation and reduce the detrimental effects of inrush current. By reducing the transistor power dissipation as well as the detrimental effects of inrush current, a significant improvement in the overall efficiency of the circuit is achieved.

19 Claims, 2 Drawing Sheets

CIRCUIT FOR LIMITING INRUSH CURRENT TO A POWER SOURCE

FIELD OF THE INVENTION

The present invention generally relates to a power supply system for electronic devices, and more particularly, to a circuit for limiting the inrush current to a power source.

BACKGROUND OF THE INVENTION

A typical power supply system includes a large electrolytic capacitor to develop a DC voltage from a fully rectified AC voltage. This large capacitor appears to be a short initially and a large inrush current is drawn from the AC source. This inrush current is limited by the line impedance and the circuit series impedance. The lower impedance in series, the higher the peak current. The inrush current will decay exponentially until it becomes zero, when the capacitor voltage becomes equal to the peak value.

Almost all of the power supply designs incorporate some sort of inrush current limiting means. The most economical way is to use an NTC thermister which has a very high impedance initially and drops to one-tenth of its value when it becomes hot during operation of the power supply. Other inrush limiting designs include a series resistance bypassed by a relay. Some designs incorporate a TRIAC or an SCR in place of a relay contactor. The relay contactor, due to its electromechanical feature, is unreliable while the SCR or the TRIAC used in series with the line are very inefficient and complex.

FIG. 1 shows an existing power supply circuit configuration 100. The circuit configuration 100 comprises a power input 101 coupled to a rectifier 102 wherein the rectifier 102 is coupled to a bypass resistor 108. The bypass resistor 108 is coupled to a relay 104 and an inductor 112. The configuration further includes an auxiliary bias 110 wherein the auxiliary bias 110 is coupled to a boost output 128.

The circuit configuration 100 includes a boost regulator power source and a circuit for limiting an inrush current 103. The rectifier bridge 102, the inductor 112, diodes 116, 122, transistor 122, capacitor 124 and pulse width modulator 126 form the boost regulator power source and boost an input AC voltage from approximately 117 volts AC, for example, to approximately 400 volts DC. Capacitor 114 is a high frequency bypass capacitor. Diode 116 is a bypass diode used to prevent saturation of the boost inductor 112. The relay 104, the resistor 108 and the auxiliary bias 110 form the circuit for limiting the inrush current.

Circuit Operation

At the first turn on of the power input 101, the relay 104 is open (contact 9 is connected with contact 10) and the bypass resistor 108 limits the current flowing through diode 116 and capacitor 114. By the time the auxiliary bias 110 reaches a voltage level required to close the relay 104 (contact 8 with contact 9), the voltage across the capacitor 114 will be equal to the AC peak voltage and the inrush current will drop to its minimal value.

However, during short outages of the power (e.g. during a brown out), the relay 104 stays on for a short period of time (e.g. 25–30 ms). As a result, if the power returns during this time, the capacitor 114 will experience a large inrush current. Additionally, the relay 104 requires an undesirably complicated and/or sensitive sensing and control circuit to turn it on and off.

Therefore, what is needed is an improved circuit for limiting inrush current in a power supply system. The circuit should be simple, cost effective and capable of being easily adapted to current technology. The present invention addresses such a need.

SUMMARY OF THE INVENTION

A circuit for limiting inrush current to a power source is disclosed. The circuit comprises a low voltage drop semiconductor device coupled to the power source and a resistor coupled in parallel with the low voltage drop semiconductor device. This circuit includes a diode coupled in parallel with the resistor and an AC detector coupled to the low voltage drop semiconductor device. The AC detector controls the low voltage drop semiconductor device in a manner such that when power is applied to the power source the inrush current to the power source is minimized.

Through the use of the present invention a low voltage drop semiconductor device is utilized in conjunction with an AC detector to simultaneously reduce transistor power dissipation and reduce the detrimental effects of inrush current. By reducing the transistor power dissipation as well as the detrimental effects of inrush current, a significant improvement in the overall efficiency of the circuit is achieved.

DETAILED DESCRIPTION

The present invention relates to an improved circuit for limiting inrush current to a power source. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides for an improved circuit for limiting inrush current to a power source. The circuit in accordance with the present invention utilizes a low voltage drop semiconductor device in conjunction with an AC detector to simultaneously reduce transistor power dissipation and reduce the detrimental effects of inrush current. By reducing the transistor power dissipation as well as the detrimental effects of inrush current, a significant improvement in the overall efficiency of the circuit is achieved.

The present invention will now be disclosed in the context of a preferred embodiment. A preferred embodiment of a method and system in accordance with the present invention incorporates an insulated-gate bipolar transistor (IGBT switch) as the low voltage drop semiconductor device. In accordance with the present invention, the IGBT switch is placed in series with a filter capacitor, rather than in series with the line current path, in order to limit the inrush current drawn from the AC line when the power is switched on. In addition to placing the IGBT switch in series with the filter capacitor, a resistor and a diode are placed in parallel with the filter capacitor. The resistor is selected to provide enough current at start up to bias an AC detect circuit and keep the IGBT switch off, thereby minimizing the inrush current at start up. An IGBT switch is utilized as opposed to a MOSFET because the high switching current of the MOSFET has the undesired effect of developing a high voltage drop in series with the filter capacitor whereas the IGBT switch has a low voltage drop.

Additionally, the circuit in accordance with the present invention implements an early power On/Off warning (EPOW) signal to turn the IGBT switch on and off. At start up time, the EPOW signal is low and the IGBT switch is OFF. During circuit operation, by the time the EPOW signal reaches a high state, the filter capacitor is already charged to the steady state via the resistor connected in parallel to the IGBT switch. Accordingly, the high state of EPOW signal will turn on the IGBT switch at a time when there is no inrush current. Furthermore, the diode in parallel provides the discharge path for the load current.

Figure 1:
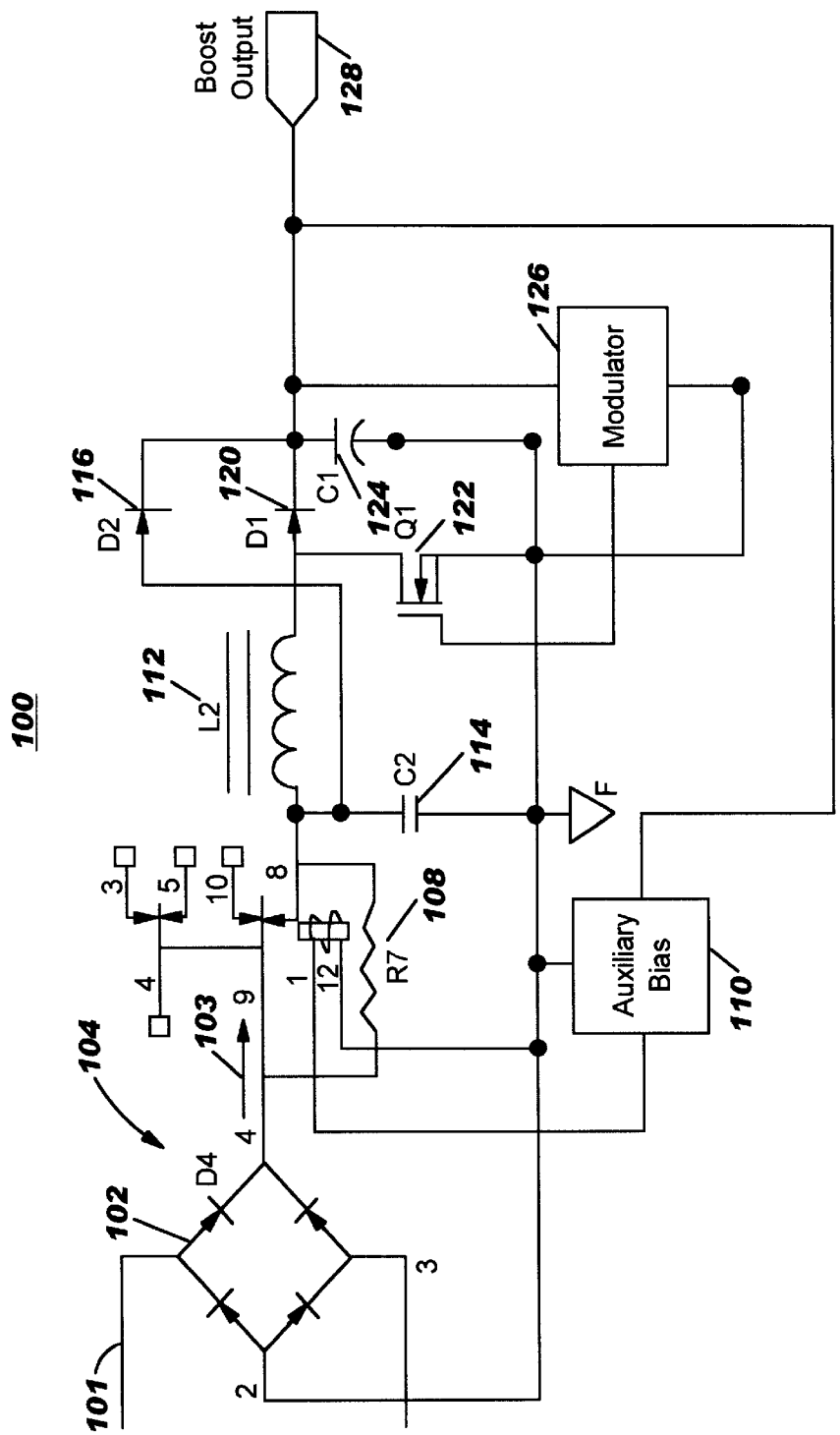
FIG. 1 shows an existing power supply circuit configuration that is used to control the AC inrush current.
Figure 2:
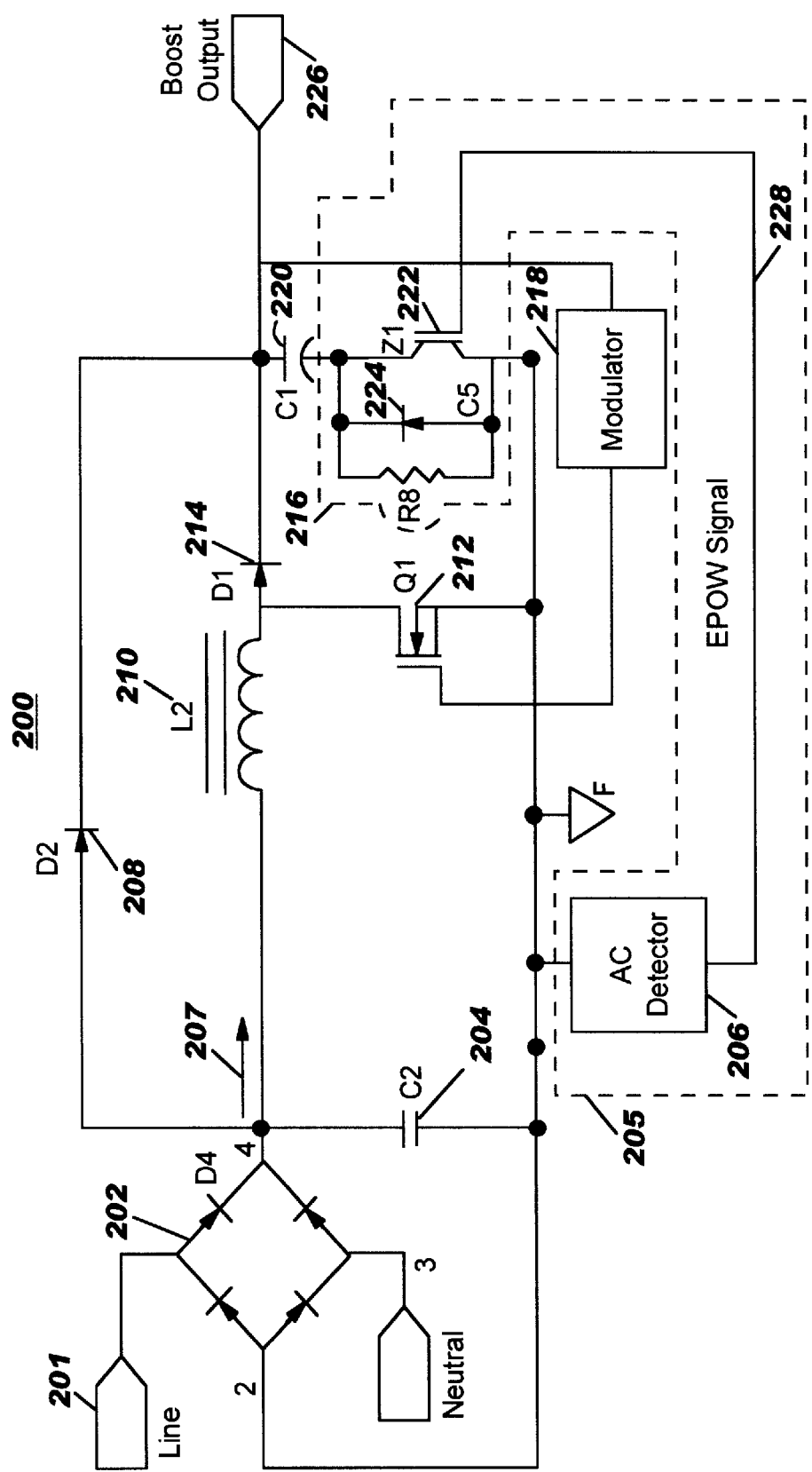
FIG. 2 shows a power supply circuit configuration in accordance with the present invention that works well during short outages of AC line disturbance and dissipates minimum power.

For a further description of the present invention, please refer to FIG. 2. FIG. 2 shows a power supply circuit configuration 200 in accordance with the present invention that works well during normal operation after minimum power. The circuit 200 comprises a power input 201, a rectifier bridge 202, a bypass capacitor 204, an AC detector 206, three diodes 208, 214, 224, an inductor 210, a transistor 212, a resistor 216, a pulse width modulator 218, a filter capacitor 220, an IGBT switch 222, and a boost output 226.

The rectifier bridge 202, the inductor 210, diodes 208, 214, transistor 212, capacitor 220 and pulse width modulator 218 form a boost regulator power source and boost the input AC voltage from 5 volts, for example, to approximately 400 volts. The AC detector 206, the resistor 216, the IGBT switch 222 and the diode 224 form a circuit 205 for limiting an inrush current 207.

The rectifier 202 is coupled to diode 208 and the bypass capacitor 204 wherein the bypass capacitor 204 is coupled to the AC detector 206 and the IGBT switch 222. The AC detector 206 generates an EPOW signal 228 and is coupled to the inductor 210 and the IGBT switch 222 wherein the IGBT switch 222 is coupled in parallel with resistor 222 and diode 224.

Diode 208 is coupled to the filter capacitor 220 and the bypass capacitor 204 wherein the filter capacitor 220 is coupled to diode 214. The diode 214 is further coupled to the inductor 210 and the transistor 212 wherein the transistor 212 is coupled to the pulse width modulator 218 and the pulse width modulator 218 is coupled to the boost output node 226.

Circuit Operation

During circuit operation, when the AC is switched on, the filter capacitor 220 is charged through diode 208 and resistor 216. Accordingly, the inrush current is minimized by resistor 216. The EPOW signal generated by AC detector 206 goes high when the AC line voltage has completed many cycles. By the time this happens, the filter capacitor 220 will be fully charged to the AC peak value via diode 208. The IGBT switch 222 can then be turned on without the filter capacitor 220 drawing any inrush current. After the capacitor 220 has equal to the AC line peak voltage, the boost regulator comprising inductor 210, transistor 212, diode 214, capacitor 220 and pulse width modulator 218 starts operating and develops a regulated DC voltage (400V) from the full-wave rectified AC voltage. When the AC line is interrupted (e.g. during AC brown out conditions), the EPOW signal goes low and turns off the IGBT switch 222 and the path for the load current to the filter capacitor 220 will be provided by diode 224. When the AC is switched back on, the EPOW signal is designed to be delayed for few cycles before it goes high again to turn on the IGBT switch 222, for example, through the use of a comparator and a R/C circuit in the AC detector. EPOW (early power off warning) signal is delayed because of the requirement to make sure for a real AC interrupt condition has occurred. This signal is delayed in ½ of an AC cycle. At start-up, this signal is delayed for approximately 10 cycles. Because the EPOW is delayed a few cycles, the filter capacitor 220 is charged through diode 208 and resistor 216 and the inrush current drawn from the AC line is again minimized by the resistor 216. Additionally, the IGBT switch 222 is in a path where the current is generally ¼ of the AC line current and therefore there is ¼th the power loss compared to the case if the switch had been placed in series with the line. This results in lower switching losses during normal operation.

Although an IGBT switch is utilized as the low-voltage drop device in the preferred embodiment, one of ordinary skill in the art readily recognizes that a variety of devices could be utilized in its place and they would be within the spirit and scope of the present invention. For example, a silicon-controlled rectifier (SCR) could be utilized and its use would be within the spirit of the present invention. Accordingly, the primary feature of the switch is that it has a low voltage drop to dissipate power and limit the inrush current.

An improved circuit for limiting inrush current in a power supply system is disclosed. The circuit in accordance with the present invention utilizes a low voltage drop semiconductor device in conjunction with an AC detect circuit to simultaneously reduce transistor power dissipation and reduce the detrimental effects of inrush current. By reducing the transistor power dissipation as well as the detrimental effects of inrush current, a significant improvement in the overall efficiency of the circuit is achieved Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A circuit for limiting an inrush current to a power source comprising:

a low voltage drop semiconductor device coupled to the power source;

a resistor coupled in parallel with the low voltage drop semiconductor device;

a diode coupled in parallel with the resistor; and an AC detector coupled to the low voltage drop semiconductor device wherein the AC detector controls the low voltage drop semiconductor device in a manner such that when power is applied to the power source the inrush current to the power source is minimized.

2. The circuit of claim 1 wherein the power source includes a filter capacitor coupled in series to the low voltage drop semiconductor device and the AC detector controls the low voltage drop semiconductor device in a manner in which the inrush current is minimized when power is applied to the power source via the power input.

3. The circuit of claim 2 wherein the AC detector generates an early power On/Off to control the switching of the low voltage drop semiconductor device.

4. The circuit of claim 3 wherein the power source comprises:
   a rectifier bridge coupled to the power input;
   an inductor coupled to the rectifier bridge; and
   a pulse width modulator wherein the inductor is coupled to a transistor and a diode wherein the transistor is coupled to the pulse width modulator and the diode is coupled to the filter capacitor.

5. The circuit of claim 4 wherein the low voltage drop semiconductor device comprises an insulated-gate bipolar transistor.

6. The circuit of claim 4 wherein the low voltage drop semiconductor device comprises a silicon-controlled rectifier.

7. An electrical power supply system comprising:
   a power source;
   a low voltage drop semiconductor device coupled to the power source;
   a resistor coupled in parallel with the low voltage drop semiconductor device;
   a diode coupled in parallel with the resistor; and
   an AC detector coupled to the low voltage drop semiconductor device wherein the AC detector controls the low voltage drop semiconductor device in a manner such that when power is applied to the power source the inrush current to the power source is minimized.

8. The system of claim 7 wherein the power source includes a filter capacitor coupled in series to the low voltage drop semiconductor device and the AC detector controls the low voltage drop semiconductor device in a manner in which the inrush current is minimized.

9. The system of claim 8 wherein the AC detector generates an early power On/Off warning signal to control the switching of the low voltage drop semiconductor device.

10. The system of claim 9 wherein the power source comprises:
    a rectifier bridge coupled to the power input;
    an inductor coupled to the rectifier bridge; and
    a pulse width modulator wherein the inductor is coupled to a transistor and a diode wherein the transistor is coupled to the pulse width modulator and the diode is coupled to the filter capacitor.

11. The system of claim 10 wherein the low voltage drop semiconductor device comprises an insulated-gate bipolar transistor.

12. The system of claim 10 wherein the low voltage drop semiconductor device comprises a silicon-controlled rectifier.

13. A circuit for limiting an inrush current to a power source comprising:
    an insulated-gate bipolar transistor coupled to the power source;
    a resistor coupled in parallel with the an insulated-gate bipolar transistor;
    a diode coupled in parallel with the resistor; and
    an AC detector coupled to an insulated-gate bipolar transistor wherein the AC detector controls an insulated-gate bipolar transistor in a manner such that when power is applied to the power source the inrush current to the power source is minimized.

14. The circuit of claim 13 wherein the power source includes a filter capacitor coupled in series to an insulated-gate bipolar transistor and the AC detector controls the an insulated-gate bipolar transistor in manner in which the inrush current is minimized.

15. The circuit of claim 14 wherein the AC detector generates an early power On/Off warning signal to control the switching of the insulated-gate bipolar transistor.

16. The circuit of claim 14 wherein the power source comprises:
    a rectifier bridge coupled to the power input;
    an inductor coupled to the rectifier bridge; and
    a pulse width modulator wherein the inductor is coupled to a transistor and a diode wherein the transistor is coupled to the pulse width modulator and the diode is coupled to the filter capacitor.

17. A circuit for limiting an inrush current to a power source comprising:
    a silicon-controlled rectifier coupled to the power source;
    a resistor coupled in parallel with the silicon-controlled rectifier;
    a diode coupled in parallel with the resistor; and
    an AC detector coupled to the silicon-controlled rectifier wherein the AC detector controls the silicon-controlled rectifier in a manner such that when power is applied to the power source the inrush current to the power source is minimized.

18. A circuit for limiting an inrush current to a power source wherein the power source comprises a rectifier bridge, an inductor coupled to the rectifier bridge and a pulse width modulator wherein the inductor is coupled to a transistor and a diode wherein the transistor is coupled to the pulse width modulator and the diode is coupled to a filter capacitor, the circuit comprising:
    an insulated-gate bipolar transistor coupled in series with the filter capacitor;
    a resistor coupled in parallel with the insulated-gate bipolar transistor;
    a diode coupled in parallel with the resistor; and
    an AC detector coupled to the insulated-gate bipolar transistor wherein the AC detector controls the insulated-gate bipolar transistor, via an early power On/Off warning signal, in a manner such that the inrush current to the power source is minimized when power is applied to the power source.

19. An electrical power supply system comprising:
    a power source wherein the power source comprises a rectifier bridge, an inductor coupled to the rectifier bridge and a pulse width modulator wherein the inductor is coupled to a transistor and a diode wherein the transistor is coupled to the pulse width modulator and the diode is coupled to a filter capacitor;
    an insulated-gate bipolar transistor coupled in series with the filter capacitor;
    a resistor coupled in parallel with the insulated-gate bipolar transistor;
    a diode coupled in parallel with the resistor; and
    an AC detector coupled to the insulated-gate bipolar transistor wherein the AC detector controls the insulated-gate bipolar transistor, via an early power On/Off warning signal, in a manner such that the inrush current to the power source is minimized when power is applied to this power source.

* * * * *